(12) United States Patent
Khanka et al.

(10) Patent No.: US 8,270,969 B1
(45) Date of Patent: Sep. 18, 2012

(54) SYSTEMS AND METHODS FOR ADJUSTING AN ACCESS SEARCH WINDOW BASED ON MOVEMENT

(75) Inventors: Bhagwan Khanka, Lenexa, KS (US); Sachin Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 259 days.

(21) Appl. No.: 12/730,407

(22) Filed: Mar. 24, 2010

(51) Int. Cl.
*H04W 4/00* (2009.01)

(52) U.S. Cl. ............. 455/434; 455/440; 455/456.1; 370/335; 370/332; 370/350

(58) Field of Classification Search .......... 455/434, 455/440, 456.1; 370/335, 332, 350
See application file for complete search history.

(56) References Cited

U.S. PATENT DOCUMENTS

| | | | |
|---|---|---|---|
| 5,577,022 A * | 11/1996 | Padovani et al. | 370/332 |
| 5,726,982 A | 3/1998 | Witter | |
| 5,805,648 A | 9/1998 | Sutton | |
| 6,188,354 B1 * | 2/2001 | Soliman et al. | 342/387 |
| 6,204,812 B1 * | 3/2001 | Fattouche | 342/457 |
| 6,229,842 B1 * | 5/2001 | Schulist et al. | 375/148 |
| 6,321,090 B1 * | 11/2001 | Soliman | 455/440 |
| 6,775,252 B1 | 8/2004 | Bayley | |
| 6,831,956 B1 | 12/2004 | Schmidl et al. | |
| 7,039,418 B2 * | 5/2006 | Amerga et al. | 455/456.1 |
| 7,236,796 B2 * | 6/2007 | Soliman | 455/456.1 |
| 7,352,704 B1 | 4/2008 | Toussi et al. | |
| 7,391,759 B2 * | 6/2008 | Wallace et al. | 370/350 |
| 7,392,045 B2 * | 6/2008 | Ben-Eli | 455/421 |
| 8,055,273 B1 * | 11/2011 | Rai et al. | 455/456.1 |
| 8,068,837 B2 * | 11/2011 | Merson et al. | 455/436 |
| 2001/0006514 A1 * | 7/2001 | Park | 370/331 |
| 2002/0098813 A1 * | 7/2002 | Likourezos et al. | 455/93 |
| 2003/0214436 A1 * | 11/2003 | Voor et al. | 342/418 |
| 2004/0131032 A1 * | 7/2004 | Sendonaris et al. | 370/335 |
| 2004/0233874 A1 * | 11/2004 | Baker | 370/335 |
| 2005/0020264 A1 * | 1/2005 | Akao et al. | 455/436 |
| 2005/0130636 A1 * | 6/2005 | Dennisson et al. | 455/414.2 |
| 2007/0223566 A1 | 9/2007 | Hughes et al. | |
| 2009/0125630 A1 * | 5/2009 | Gogic | 709/227 |

FOREIGN PATENT DOCUMENTS

EP 1107483 A1 * 6/2001

* cited by examiner

*Primary Examiner* — Charles Shedrick

(57) ABSTRACT

Methods and systems for adjusting the access search window based on the movement of a mobile station (MS) are disclosed. The MS searches for pilot signals using a search window that has an initial size. At a first and second time, the MS determines its position. The MS then determines the distance between the position of the MS at the first time and the second time. When the distance is less than a threshold distance, the MS measures the strength of a pilot signal within the access search window and identifies one or more signal peaks within the access search window that are above a specified signal strength. Next, the MS modifies the access search window into one or more smaller access search windows. The one or more smaller access search windows collectively have a size that is smaller than the initial size.

20 Claims, 7 Drawing Sheets

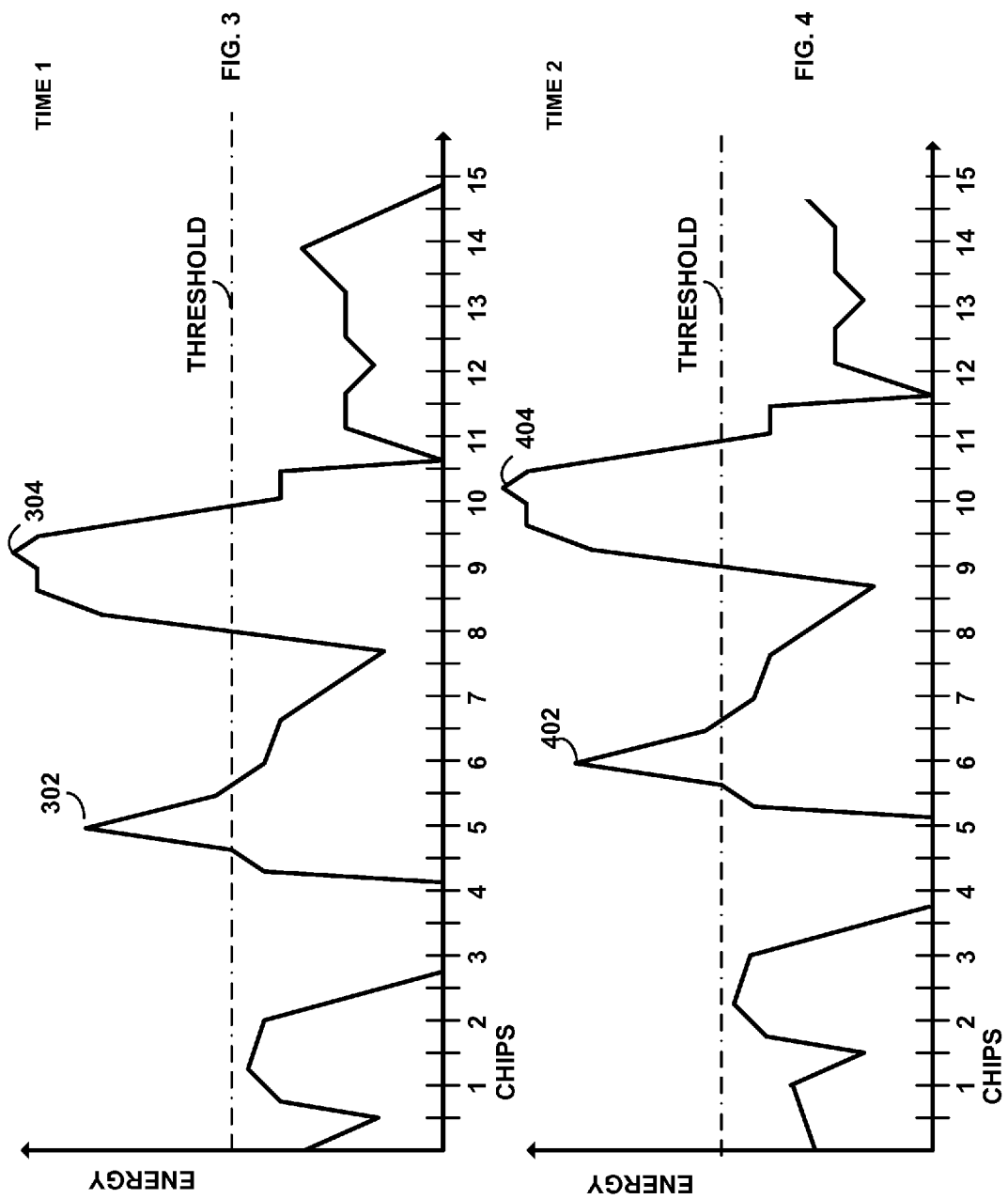

SYSTEMS AND METHODS FOR ADJUSTING AN ACCESS SEARCH WINDOW BASED ON MOVEMENT

BACKGROUND

Many people use mobile stations (MSs), such as cell phones and personal digital assistants (PDAs), to communicate with cellular wireless networks. These MSs and networks typically communicate with each other over a radio-frequency (RF) air interface according to a wireless communication protocol such as Code Division Multiple Access (CDMA), perhaps in conformance with one or more industry specifications such as IS-95 and IS-2000. Wireless networks that operate according to these specifications are also referred to as "1xRTT (1x) networks," which stands for "Single Carrier Radio Transmission Technology". These networks (referred to herein as "CDMA networks") typically provide communication services such as voice, Short Message Service (SMS) messaging, and packet-data communication.

Typical CDMA networks include a plurality of base stations, each of which provide one or more wireless coverage areas, such as cells and sectors. As a general matter, sectors are used herein as examples of wireless coverage areas. When an MS is positioned in a sector, it can communicate over the RF air interface with the base station, and, in turn, over one or more circuit-switched and/or packet-switched signaling and/or transport networks to which the base station provides access. The base station and the MS conduct these communications over a frequency known as a carrier. Note that base stations may provide service in a sector on one carrier, or on more than one, and further that a given instance of a given carrier in a given sector may be referred to herein as a "sector/carrier."

In general, a pilot channel functions to alert MSs in a given sector of the presence of a service-providing base station. Typically, the pilot channel conveys a value known as a pseudorandom number (PN) offset, which identifies the sector; in particular, by being offset from CDMA system time by a certain amount of time, the pilot channel conveys the PN offset. MSs generally use the pilot channel to coherently detect and demodulate the signal on a sector/carrier.

In a typical wireless network, an MS maintains different base-station-signal sets that typically include an active set, a candidate set, a neighbor set, and a remaining set. At a given time, the active set comprises one or more "active" sectors or coverage areas that are being used to maintain a call for the MS. The MS receives substantially the same information from each of the coverage areas in the active set and, on a frame-by-frame basis, selects the best signal to use. The candidate set comprises sectors that are not presently assigned to a call, but are strong enough to be used for a call. The neighbor set comprises sectors having signals that could be received with sufficient strength to enable successful communication. The remaining set comprises sectors the MS is in communication with that are not in the active, candidate or neighbor sets. The MS, one or more base stations, and/or a base station controller maintains in memory a list of the coverage areas in the MS's base-station-signal sets.

In existing systems, to facilitate a determination of which sectors should be in the MS's active and neighbor set, all base stations emit their pilot signal at a power level that is typically higher than other forward-link signals. An MS constantly measures the strength of each pilot that it receives, and notifies at least one base station when pilot strength for various coverage areas falls above or below designated thresholds. The base station, may, in turn, provide the MS with updated lists of the sectors in the various base-station-signal sets corresponding to that MS.

In a CDMA system configured as above, a link from the base station to the MS is called a forward link and a link from the MS to the base station is called a reverse link. All forward links from a given base station have the same PN offset. As stated, the PN offset is transmitted via the pilot signal, as one of the forward-link channels. An MS continuously monitors the pilot signal in order to obtain a good quality signal on the forward link. An MS located within the coverage area of the base station uses the pilot signal for synchronization. An MS can acquire the timing of the CDMA forward-link traffic channel from the pilot signal and obtain the phase reference for coherent demodulation.

OVERVIEW

In current implementations, an MS uses a search window to search for pilot signals. The search window is the amount of time, in terms of chips, that an MS will search for a pilot, where a chip is the unit of code spreading for CDMA (one chip is approximately 0.8 µs in duration, and corresponds to a distance of approximately 244 meters). The search-window size is typically fixed. Accordingly, the MS will constantly search through the entire search window to find pilot signals. Typically, if the position of the MS is relatively stationary over time, the strongest pilot signals will remain at or near the same point within the access search window.

Accordingly, the disclosed embodiments are methods and systems for adjusting the access search window based on the movement of the MS. Initially, the MS searches for pilot signals using a search window that has an initial size. At a first time and at a second time, the MS determines its position. The MS then determines the distance between the position of the MS at the first time and the position of the MS at the second time. When the distance is less than a threshold distance, the MS measures the strength of a pilot signal within the access search window and identifies one or more signal peaks within the access search window that are above a specified signal strength. Next, the MS modifies the access search window into one or more smaller access search windows. The one or more smaller access search windows collectively have a size that is smaller than the initial size. Additionally, the one or more smaller access search windows encompass the one or more identified signal peaks.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF DRAWINGS

Various exemplary embodiments are described herein with reference to the following drawings, wherein like numerals denote like entities.

FIG. 3 is a depiction of an access search window at a first time.

FIG. 4 is a depiction of an access search window at a second time.

DETAILED DESCRIPTION OF EXEMPLARY EMBODIMENTS

Figure 1:
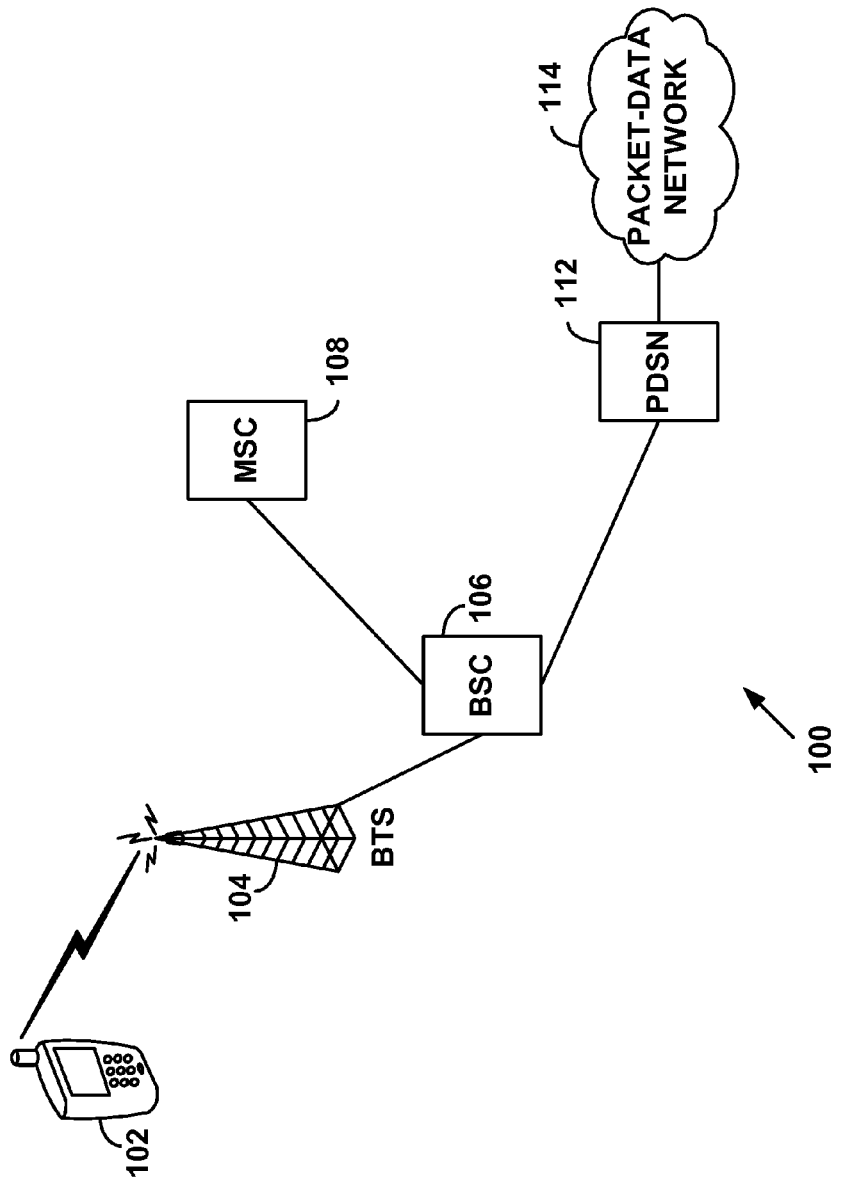
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present, such as additional mobile stations in communication with BTS 104, additional BTSs in communication with BSC 106, and additional BSCs in communication with MSC 108, etc.; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114. And PSTN 110 and PDN 114 may be connected via one or more gateways and/or other devices. And other variations and/or additions are possible as well.

MS 102 may be any mobile device arranged to carry out the mobile-station functions described herein. As such, MS 102 may include a user interface, a wireless-communication interface, a processor, and data storage comprising instructions executable by the processor for carrying out those MS functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks. The processor and data storage may be any suitable components known to those of skill in the art. As examples, MS 102 could be or include a cell phone, a PDA, a computer, a laptop computer, a hybrid CDMA/EV-DO device, and/or a multi-mode cellular/Wi-Fi device.

Note that the combination of BTS 104 and BSC 106 may be considered—and referred to herein as—a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA (and/or other protocol) coverage areas such as cells and sectors, for communicating with MSs, such as MS 102, over an air interface. The communication interface may also include one or more wired and/or wireless interfaces for communicating with at least BSC 106. As an example, a wired Ethernet interface may be included.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between MSs and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between MSs and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

Figure 2:
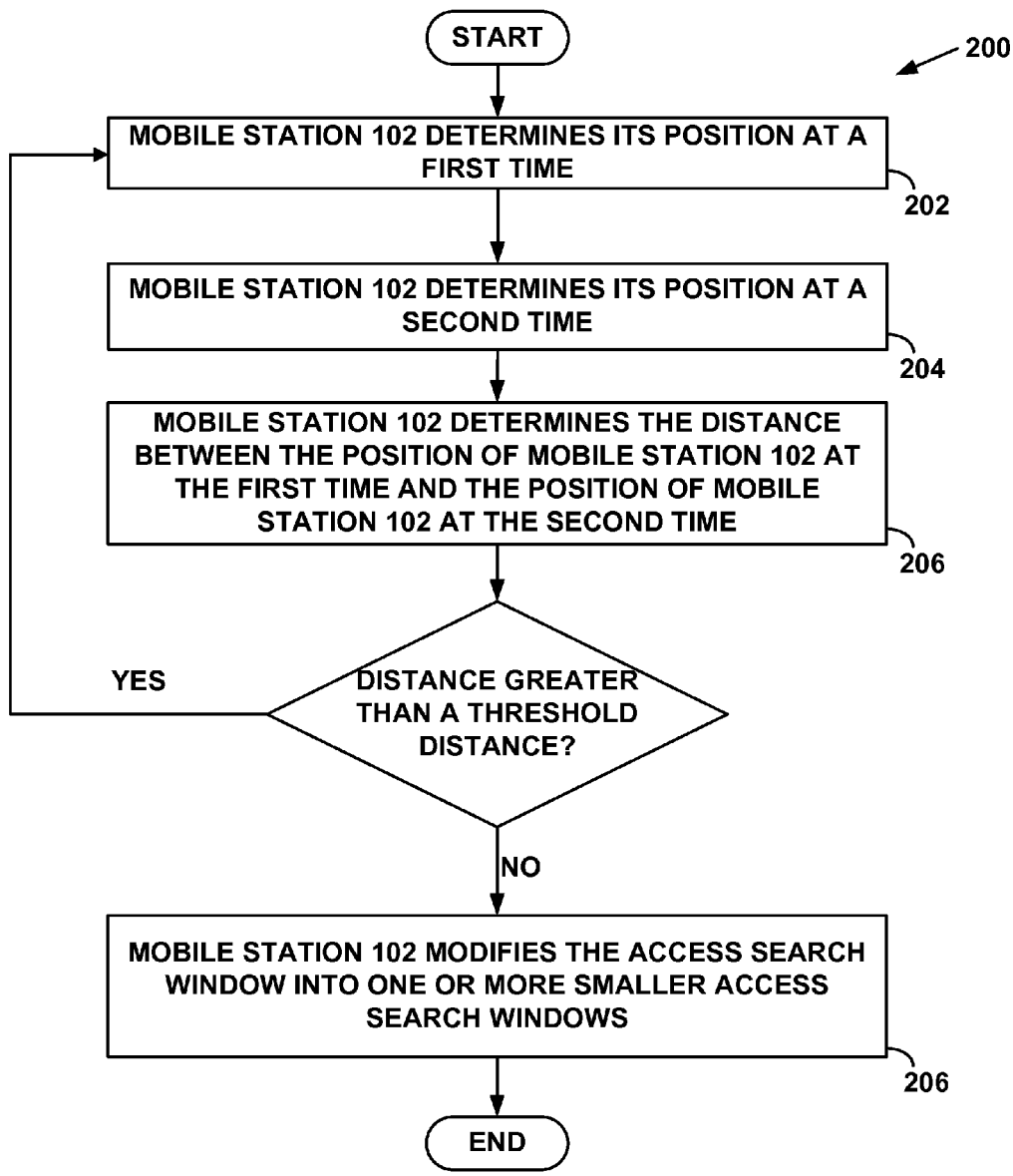
FIG. 2 is a flowchart of a method, in accordance with exemplary embodiments.

FIG. 2 depicts a flowchart of method 200 for adjusting the access search window based on movement. The access search window may be set to an initial size. As shown in FIG. 2, method 200 begins at step 202, where MS 102 determines its position at a first time. At step 204, MS 102 determines its position at a second time. The times at which the mobile station determines its position (for example, the first time and the second time) may be hard-coded into MS 102, or may be provided to MS 102 by another entity (such as a base station). For example, MS 102 may determine its position every time it searches its access search window. As another example, MS 102 may determine its position every second. As yet another example, MS 102 may receive an instruction from a base station to determine its position every 10 seconds. Other examples are possible as well.

There are several ways MS 102 may determine its position. For example, MS 102 may include a GPS receiver and may utilize the GPS receiver to obtain the physical coordinates of MS 102 at the first time and the second time.

As another example, MS 102 may associate its position at the first time and the second time with signal peaks within its access search window that are above a threshold signal strength. The threshold strength value may be hard-coded into MS 102, or may be provided by a network operator via, for example, a base station.

FIG. 3 is a depiction of an access search window at the first time. As shown in FIG. 3, the access search window has a range from 0 to 15 chips, and signal peaks 302 and 304 are above the threshold. MS 102 may associate its position at the first time with signal peaks 302 and 304.

FIG. 4 is a depiction of an access search window at the second time. As shown in FIG. 4, the access search window has a range from 0 to 15 chips, and signal peaks 402 and 404 are above the threshold signal strength. MS 102 may associate its position at the second time with signal peaks 402 and 404. In addition, MS 102 may correlate the signal peaks it identified at the second time with the signal peaks it identified at the first time. For example, MS 102 may correlate signal peak 402 with signal peak 302, and MS 102 may correlate signal peak 404 with signal peak 304. The signal peaks may be correlated using the shape of the signal peak, and the distance between the signal peaks, for instance. The signal peaks may be correlated using other methods as well.

At step 206, MS 102 determines the distance between the position of the mobile station at the first time and the position of the mobile station at the second time. If MS 102 is using GPS to determine its position, MS 102 may determine the difference between the GPS coordinates at the first time and the second time. If MS 102 is using signal peaks within the access search window to determine its position, MS 102 may determine the distance based on the correlated signal peaks. For example, MS 102 may determine the number of chips between the correlated signal peaks 302/402 and 304/404.

If the distance is greater than a threshold distance, the method returns to step 202. If the distance not greater than the threshold distance, MS 102 measures the strength of the signal within the access search window and identifies any signal peaks within the access search window that are above a threshold signal strength. It should be understood that the threshold value may be (1) the same value discussed above with respect to steps 202 and 204 regarding how MS 102 determines its position, or (2) a different threshold value. The threshold distances and threshold signal strengths may be hard-coded into MS 102, or may be provided by a network operator via, for example, a base station.

At step 206, MS 102 modifies the access search window into one or more smaller access search windows. Each of the one or more smaller access search windows has a size that is smaller than the initial size. The one or more smaller access search windows collectively encompass the one or more signal peaks.

Figure 5:
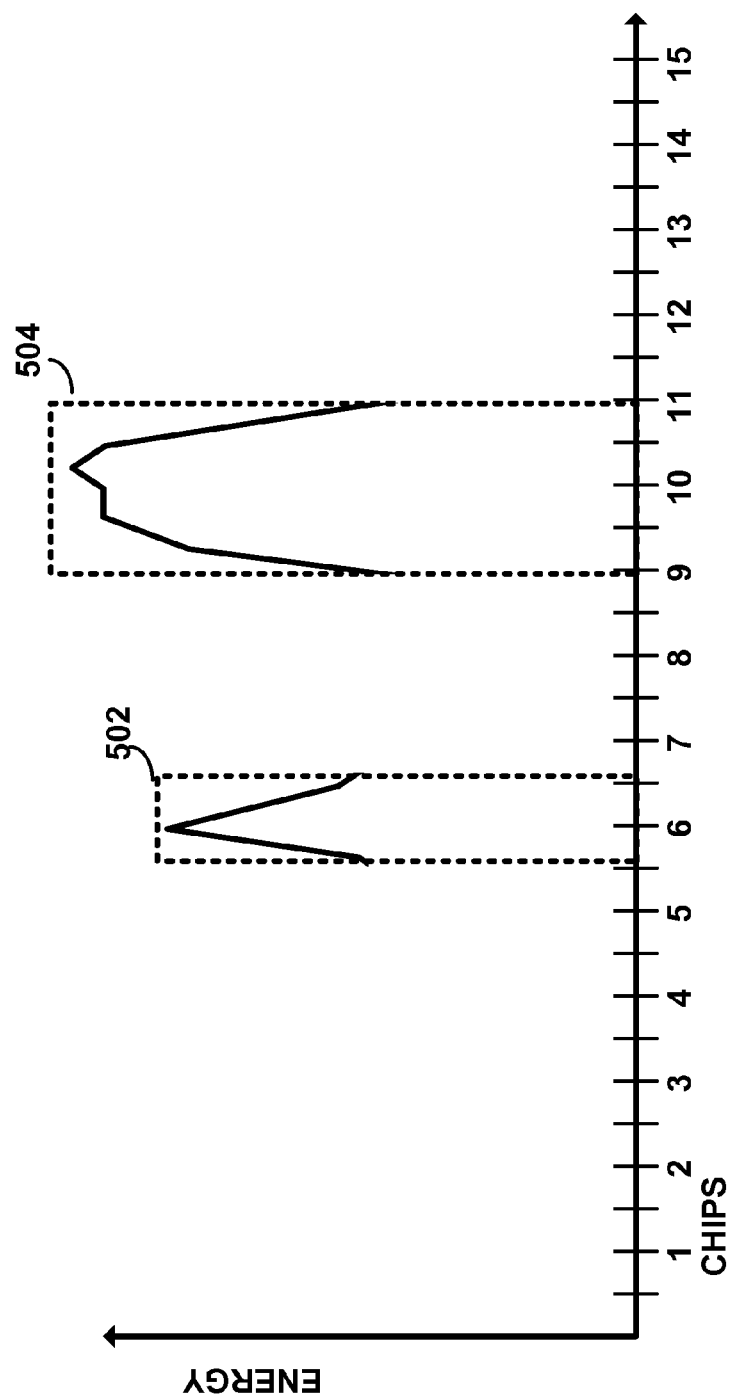
FIG. 5 is a depiction of smaller access search windows at a third time.

FIG. 5 is a depiction of two smaller access search windows 502 and 504 that encompass the signal peaks that are above the specified signal strength. As can be seen in FIG. 5, the size of the access search windows 502 and 504 is collectively smaller than the initial access search window depicted in FIGS. 3 and 4. Accordingly, MS 102 will devote fewer resources to searching access search windows 502 and 504 as it would to searching the initial access search window.

Figure 6:
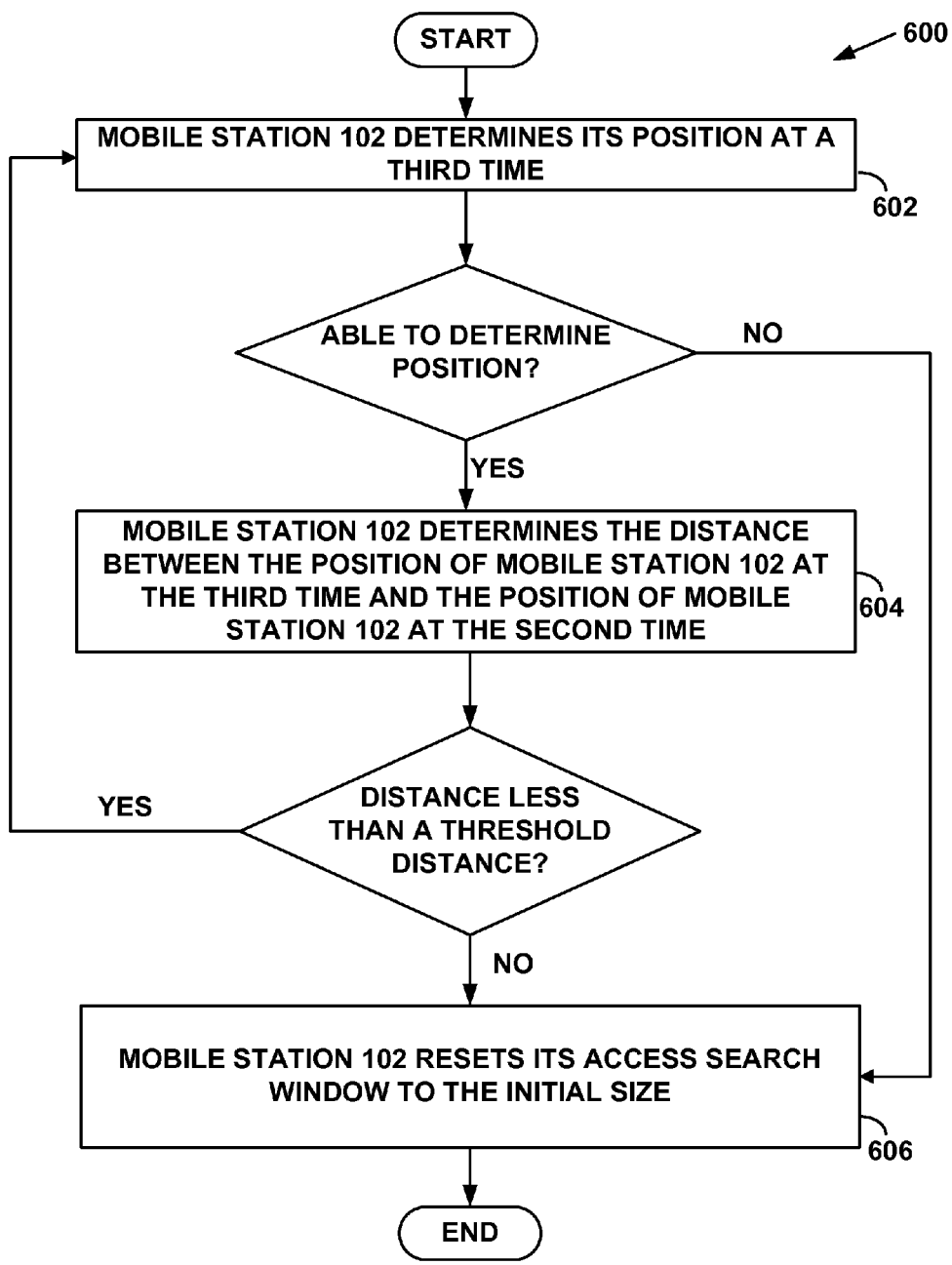
FIG. 6 is a flow chart depicting a function that can be carried out in accordance with exemplary embodiments.

FIG. 6 is a flowchart of a method 600 for adjusting the size of the one or more smaller access search windows based on movement. As shown in FIG. 6, at step 602, subsequent to the access search window being modified into one or more smaller access search windows, MS 102 determines is position at a third time. MS 102 may determine its position using one or more of the methods described above, for example. In some situations MS 102 may be unable to determine the position of MS 102 at the third time. For example, if MS 102 is determining its position by identifying signal peaks within the smaller access search window, it is possible that the signal peak will have moved outside of the smaller access search window, and thus MS 102 will be unable to locate any signal peaks. If MS 102 is unable to locate the signal peak, the method proceeds to step 606, where MS 102 resets the access search window to the initial size.

If MS 102 is able to determine its position at the third time, then at step 604 MS 102 determines the distance between the position of MS 102 at the third time and the position of MS 102 at the second time. MS 102 may, for example, determine the distance using the methods described above. If the distance between the position of MS 102 at the third time and the position of MS 102 at the second time is less than a threshold distance, the method returns to step 602. If the distance between the position of MS 102 at the third time and the position of MS 102 at the second time is not loss than the threshold distance, then at step 606, MS 102 resets its access search window to the initial size.

Figure 7:
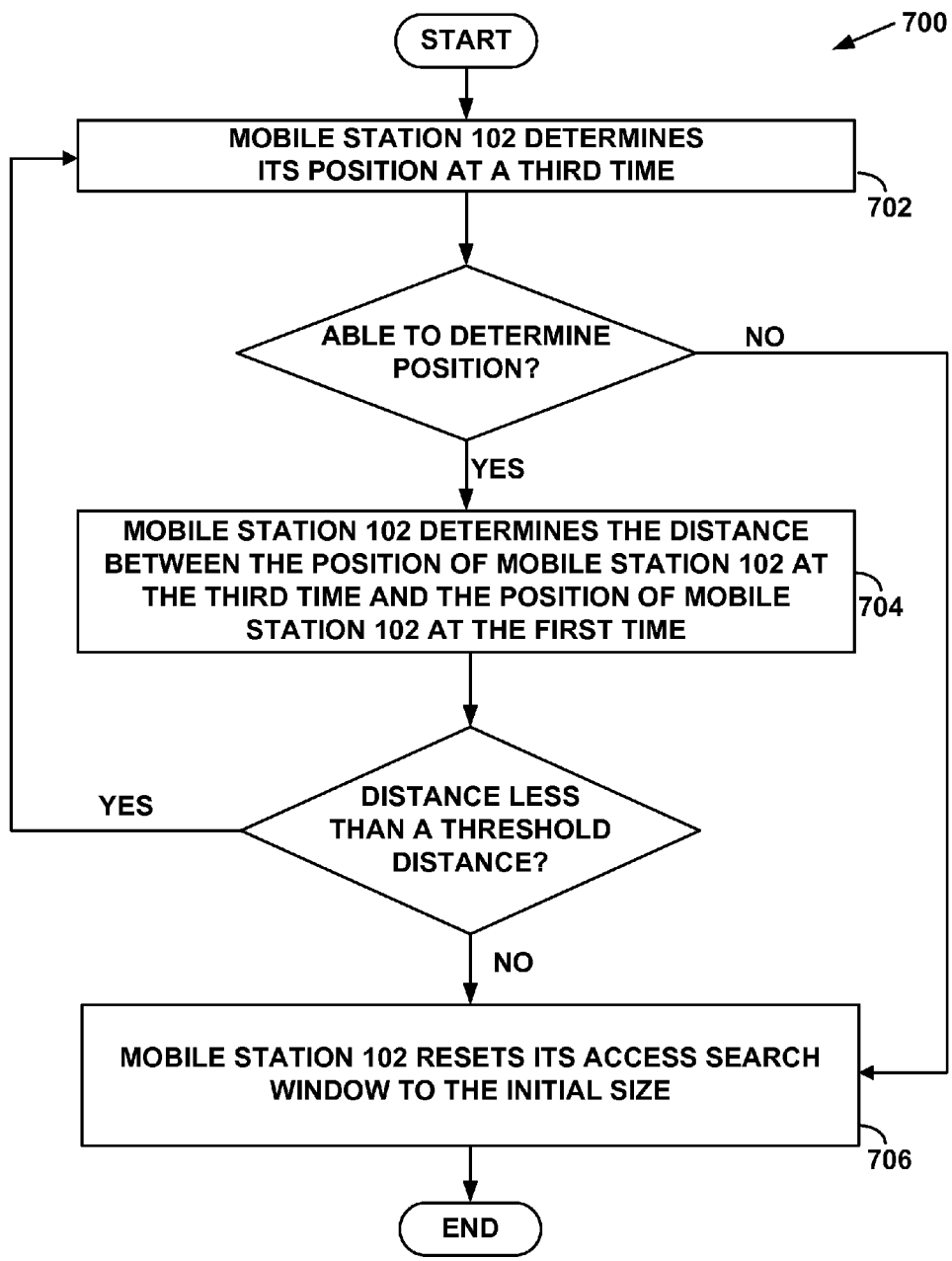
FIG. 7 is a flow chart depicting a function that can be carried out in accordance with exemplary embodiments.

FIG. 7 is a flowchart of a method 700 for adjusting the size of the one or more smaller access search windows based on movement. As shown in FIG. 7, at step 702, subsequent to the access search window being modified into one or more smaller access search windows, MS 102 determines is position at a third time. MS 102 may determine its position using the methods described above, for example. In some situations MS 102 may be unable to determine the position of MS 102 at the third time. For example, if MS 102 is determining its position by identifying signal peaks within the smaller access search window, it is possible that the signal peak will have moved outside of the smaller access search window, and thus MS 102 will be unable to locate any signal peaks. If MS 102 is unable to locate any signal peaks, the method proceeds to step 706, where MS 102 resets the access search window to the initial size.

If MS 102 is able to determine its position at the third time, then at step 704, MS 102 determines the distance between the position of MS 102 at the third time and the position of MS 102 at the first time. MS 102 may, for example, determine the distance using one or more of the methods described above. If the distance between the position of MS 102 at the third time and the position of MS 102 at the first time is less than a threshold distance, the method returns to step 702. If the distance between the position of MS 102 at the third time and the position of MS 102 at the first time is not less than the threshold distance, then at step 706, MS 102 resets its access search window to the initial size.

Figure 8:
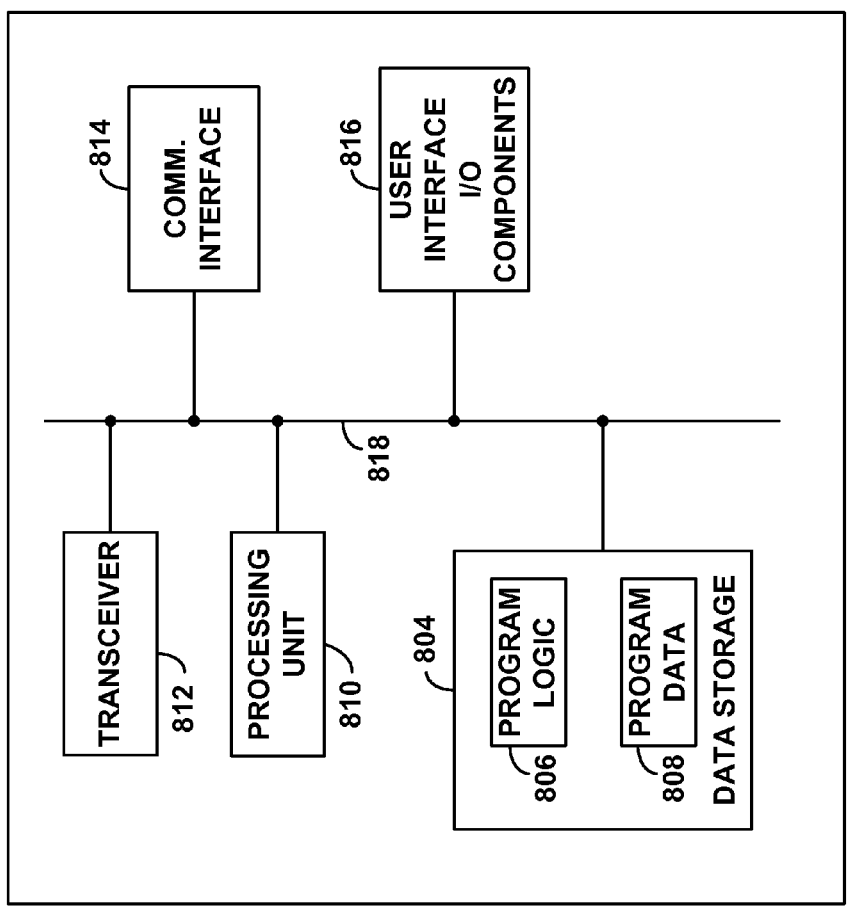
FIG. 8 is a simplified block diagram of a mobile station, in accordance exemplary embodiments.

FIG. 8 is a simplified block diagram depicting functional components of an example mobile station that can carry out aspects of the present invention. As shown in FIG. 8, the example mobile station includes data storage 804, processing unit 810, transceiver 812, communication interface 814, user-interface I/O components 816, and a system bus or other mechanism 818.

These components may be arranged to support conventional operation in a wireless communication network that is compliant with the CDMA family of protocols, such as network 100 illustrated in FIG. 1. The details of such an arrangement and how these components function to provide conventional operation are known in the art, and are not described further herein. And one or more protocols other than or in addition to CDMA may be supported in different embodiments.

Communication interface 814 in combination with transceiver 812, which may include one or more antennas, supports forward and reverse-link channels for communications with the network, including receiving pilot signals, etc. The communication interface may include a module, such as an MSM™-series chipset made by Qualcomm Inc. of San Diego, Calif., and support wireless packet-data communications according to the CDMA family of protocols.

Processing unit 810 may comprise one or more general-purpose processors (e.g., INTEL microprocessors) and/or one or more special-purpose processors (e.g., dedicated digital signal processor, application specific integrated circuit, etc.). In turn, the data storage 804 may comprise one or more volatile and/or non-volatile storage components, such as magnetic or optical memory or disk storage. Data storage 804 can be integrated in whole or in part with processing unit 810, as cache memory or registers for instance. Data storage 804 may be configured to hold both program logic 806 and program data 808.

Program logic 806 may comprise machine-language instructions that define routines executable by processing unit 810 to carry out various functions described herein. For example, the program logic, communication interface, and transceiver may operate cooperatively to carry out logical operation such as that discussed above and illustrated in FIGS. 2, 6 and 7. Further, program data 808 may be arranged to store algorithms for determining and comparing distances and topologies, as described above. Program data 808 could also comprise storage for various parameters of the methods (e.g., access search window size, physical location, etc.) also discussed above.

Various exemplary embodiments have been described above. Those skilled in the art will understand, however, that changes and modifications may be made to those examples without departing from the scope of the claims.

What is claimed is:

1. A method for a mobile station having an access search window to adjust the access search window, the method comprising:
   the mobile station determining its position at a first time;
   the mobile station determining its position at a second time;
   the mobile station determining whether a distance between the position of the mobile station at the first time and the position of the mobile station at the second time is less than a threshold distance; and
   in response to determining that the distance is less than the threshold distance, the mobile station (i) measuring a strength of a signal within the access search window, wherein the access search window has an initial size, (ii) identifying one or more signal peaks within the access search window, wherein the one or more identified signal peaks are above a specified signal strength, and (iii) modifying the access search window into one or more smaller access search windows, wherein the one or more smaller access search windows collectively have a size that is smaller than the initial size, and wherein the one or more smaller access search windows encompass the one or more identified signal peaks.

2. The method of claim 1, further comprising:
   at or about the first time, the mobile station (i) measuring the strength of the signal within the access search window, (ii) identifying one or more signal peaks within the access search window, wherein the one or more signal peaks are above the specified signal strength, and (iii) associating the position of the mobile station at the first time with the identified signal peaks.

3. The method of claim 2, further comprising:
   at or about the second time, the mobile station (i) measuring the strength of the signal within the access search window, and (ii) identifying one or more signal peaks within the at least one smaller access search window, wherein the one or more signal peaks are above the specified signal strength, (iii) associating the position of the mobile station at the second time with the identified signal peaks, and (iv) correlating the one or more signal peaks identified at the second time with the one or more signal peaks identified at the first time.

4. The method of claim 3, wherein the mobile station determining whether the distance between the position of the mobile station at the first time and the position of the mobile station at the second time is less than the threshold distance comprises:
   the mobile station determining a distance based on the correlated signal peaks.

5. The method of claim 4, wherein the mobile station determining the distance based on the correlated signal peaks comprises:
   the mobile station determining a number of chips between the correlated signal peaks.

6. The method of claim 1, further comprising:
   subsequent to modifying the access search window into one or more smaller access search windows, the mobile station determining its position at a third time;
   the mobile station determining whether a distance between the position of the mobile station at the third time and the position of the mobile station at the second time is more than the threshold distance; and
   in response to determining that the distance between the position of the mobile station at the third time and the position of the mobile station at the second time is more than the threshold distance, the mobile station resetting the access search window to the initial size.

7. The method of claim 1, further comprising:
   subsequent to modifying the access search window into one or more smaller access search windows, the mobile station determining its position at a third time;
   the mobile station determining whether a distance between the position of the mobile station at the third time and the position of the mobile station at the first time is more than the threshold distance; and
   in response to determining that the distance between the position of the mobile station at the third time and the position of the mobile station at the first time is more than the threshold distance, the mobile station resetting the access search window to the initial size.

8. The method of claim 1, wherein the mobile station determining its position at the first time and the second time comprises the mobile station determining its position at the first time and the second time using GPS.

9. The method of claim 8, wherein the mobile station determining whether the distance between the position of the mobile station at the first time and the position of the mobile station at the second time is less than a threshold distance comprises:
the mobile station determining a distance between a GPS position at the first time and a GPS position at the second time.

10. The method of claim 1, wherein modifying the access search window into one or more smaller access search windows comprises:
selecting two of the identified signal peaks, wherein the two selected signal peaks are above all other identified signal peaks within the access search window; and
modifying the access search window into one or more access search windows that encompass only the two selected peaks.

11. A mobile station comprising:
a communication interface;
a processing unit;
data storage; and
program logic stored in the data storage and executable by the processing unit to:
determine the position of the mobile station at a first time;
determine the position of the mobile station at a second time;
determine whether a distance between the position of the mobile station at the first time and the position of the mobile station at the second time is less than a threshold distance; and
in response to determining that the distance is less than the threshold distance, (i) measure a strength of a signal within the access search window, wherein the access search window has an initial size (ii) identify one or more signal peaks within the access search window, wherein the one or more identified signal peaks are above a specified signal strength, and (iii) modify the access search window into one or more smaller access search windows, wherein the one or more smaller access search windows collectively have a size that is smaller than the initial size, and wherein the one or more smaller access search windows encompass the one or more identified signal peaks.

12. The mobile station of claim 11, wherein the program logic is further executable by the processing unit to:
at or about the first time, (i) measure the strength of the signal within the access search window, (ii) identify one or more signal peaks within the access search window, wherein the one or more signal peaks are above a specified signal strength, and (iii) associate the position of the mobile station at the first time with the identified signal peaks.

13. The mobile station of claim 12, wherein the program logic is further executable by the processing unit to:
at or about the second time, (i) measure the strength of the signal within the access search window, and (ii) identify one or more signal peaks within the at least one smaller access search window, wherein the one or more signal peaks are above the specified signal strength, (iii) associate the position of the mobile station at the second time with the identified signal peaks, and (iv) correlate the one or more signal peaks identified at the second time with the one or more signal peaks identified at the first time.

14. The mobile station of claim 13, wherein the program logic is further executable by the processing unit to:
determine a distance based on the correlated signal peaks.

15. The mobile station of claim 13, wherein the program logic is further executable by the processing unit to:
determine a number of chips between the correlated signal peaks.

16. The mobile station of claim 11, wherein program logic is further executable by the processing unit to:
subsequent to the access search window being modified into one or more smaller access search windows, determine a position of the mobile station at a third time;
determine whether a distance between the position of the mobile station at the third time and the position of the mobile station at the second time is more than the threshold distance; and
in response to determining that the distance between the position of the mobile station at the third time and the position of the mobile station at the second time is more than the threshold distance, the mobile station resetting the access search window to the initial size.

17. The mobile station of claim 11, wherein program logic is further executable by the processing unit to:
subsequent to the access search window being modified into one or more smaller access search windows, determine a position of the mobile station at a third time;
determine whether a distance between the position of the mobile station at the third time and the position of the mobile station at the first time is more than the threshold distance; and
in response to determining that the distance between the position of the mobile station at the third time and the position of the mobile station at the first time is more than the threshold distance, the mobile station resetting the access search window to the initial size.

18. The mobile station of claim 11, wherein the program logic is executable by the processing unit to determine the position of the mobile station at the first time further comprises program logic executable by the processing unit to determine the position of the mobile station at the first time and the second time using GPS.

19. The mobile station of claim 18, wherein the program logic is executable by the processing unit to determine the distance between the position of the mobile station at the first time and the position of the mobile station at the second time further comprises program logic executable by the processing unit to determine a distance between a GPS position at the first time and a GPS position at the second time.

20. The mobile station of claim 11, wherein the program logic is executable by the processing unit to modify the access search window into one or more smaller access search windows comprises program logic executable by the processing unit to:
select two signal peaks, wherein the two selected signal peaks are above all other identified signal peaks within the access search window;
modify the access search window into one or more access search windows that encompass only the two selected peaks.

* * * * *